United States Patent
Zhang et al.

(10) Patent No.: US 12,405,901 B2
(45) Date of Patent: Sep. 2, 2025

(54) METHOD FOR CONFIGURING ADDRESS TRANSLATION RELATIONSHIP, AND COMPUTER SYSTEM

(71) Applicant: HUAWEI TECHNOLOGIES CO., LTD., Guangdong (CN)

(72) Inventors: Zhangkai Zhang, Beijing (CN); Dongdong Yao, Beijing (CN); Cong Wang, Beijing (CN); Yihua Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 18/314,999

(22) Filed: May 10, 2023

(65) Prior Publication Data

US 2023/0281135 A1    Sep. 7, 2023

Related U.S. Application Data

(63) Continuation of application No. PCT/CN2021/130316, filed on Nov. 12, 2021.

(30) Foreign Application Priority Data

Nov. 12, 2020   (CN) .......................... 202011265320.1

(51) Int. Cl.
  *G06F 12/10*    (2016.01)
  *G06F 12/1009*    (2016.01)
  (Continued)

(52) U.S. Cl.
  CPC ...... *G06F 12/1441* (2013.01); *G06F 12/1009* (2013.01); *G06F 12/1036* (2013.01)

(58) Field of Classification Search
  CPC ............. G06F 12/1441; G06F 12/1009; G06F 12/1036; G06F 12/145; G06F 12/1072;
  (Continued)

(56) References Cited

U.S. PATENT DOCUMENTS 10,592,428 B1   3/2020  Saidi
11,461,247 B1 * 10/2022  Bolbenes ............ G06F 12/1475
  (Continued)

FOREIGN PATENT DOCUMENTS

CN    109522754 A   3/2019
CN    109558211 A   4/2019
  (Continued)

OTHER PUBLICATIONS

Extended European Search Report in European Appln. No. 21891213. 7, mailed on Feb. 26, 2024, 8 pages.
  (Continued)

*Primary Examiner* — Khoa D Doan
(74) *Attorney, Agent, or Firm* — Fish & Richardson P.C.

(57) ABSTRACT

Methods and systems for configuring an address translation relationship is disclosed. In an implementation, a method comprises: transferring, by a virtual machine manager (VMM) deployed in a rich execution environment (REE) of a computer system, a first address translation relationship to a secure partition manager (SPM) deployed in a trusted execution environment (TEE) of the computer system, wherein the first address translation relationship comprises an address translation relationship from an intermediate physical address (IPA) allocated to a virtual machine (VM) deployed in the REE to a physical address (PA) for the SPM to perform IPA-to-PA address translation based on the first address translation relationship when transmitting data from the SP to the VM, wherein the PA is a memory address.

14 Claims, 9 Drawing Sheets

(51) Int. Cl.
*G06F 12/1036* (2016.01)
*G06F 12/14* (2006.01)

(58) Field of Classification Search
CPC .......... G06F 12/0292; G06F 9/44505; G06F 9/45558; G06F 9/544; G06F 9/545; G06F 21/53; G06F 21/78; G06F 2009/45583; G06F 2009/45587
See application file for complete search history.

(56) References Cited

U.S. PATENT DOCUMENTS

| | | | |
|---|---|---|---|
| 12,045,471 B2* | 7/2024 | Chatterjee | G06F 13/28 |
| 2004/0143720 A1* | 7/2004 | Mansell | G06F 12/1063 711/163 |
| 2005/0114616 A1* | 5/2005 | Tune | G06F 12/1441 711/163 |
| 2016/0350534 A1* | 12/2016 | Poornachandran | G06F 21/554 |
| 2016/0364341 A1* | 12/2016 | Banginwar | G06F 9/485 |
| 2018/0074863 A1* | 3/2018 | Kung | G06F 12/0292 |
| 2018/0121125 A1* | 5/2018 | Zeng | G06F 3/0622 |
| 2018/0129525 A1* | 5/2018 | Hong | G06F 12/1009 |
| 2018/0136967 A1* | 5/2018 | Asbe | G06F 21/53 |
| 2019/0205264 A1 | 7/2019 | Varghese et al. | |
| 2019/0311141 A1* | 10/2019 | Brehove | G06F 21/85 |

FOREIGN PATENT DOCUMENTS

| | | |
|---|---|---|
| CN | 109783188 A | 5/2019 |
| CN | 111400702 A | 7/2020 |

OTHER PUBLICATIONS

Architecture and Technology Group, "Arm Platform Security Architecture Firmware Framework 1.0," DEN 0063, Jun. 19, 2019, 101 pages.

* cited by examiner

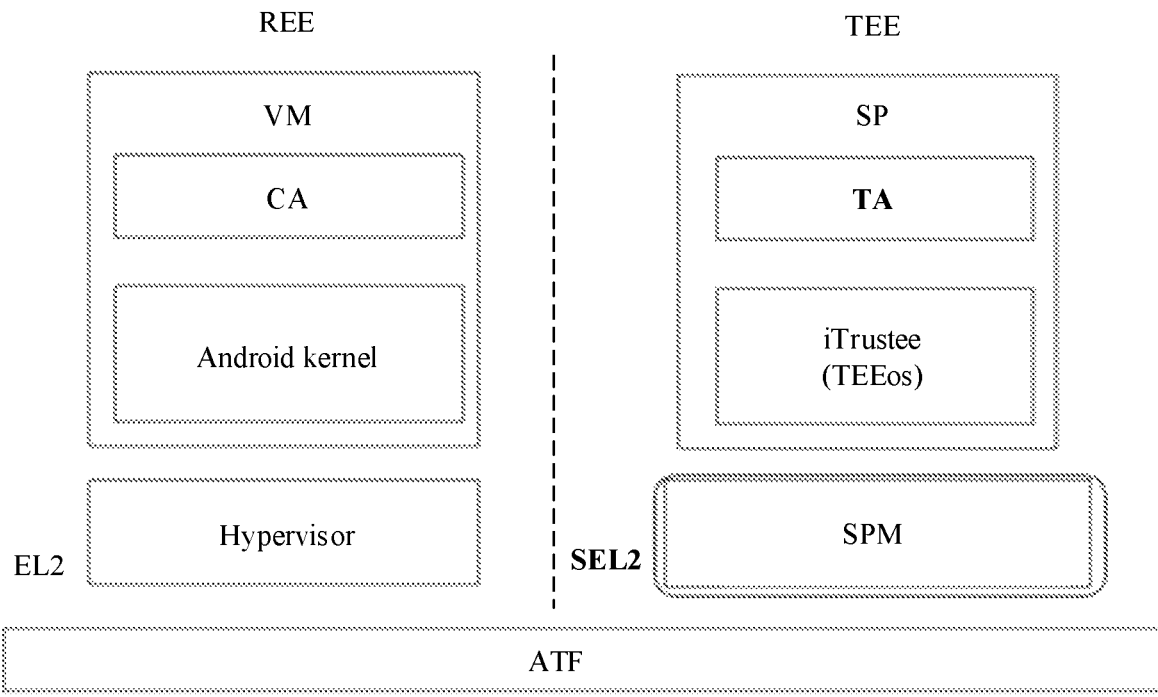

FIG. 4

A VMM transfers a first address translation relationship to an SPM, where the first address translation relationship includes an address translation relationship from an intermediate physical address IPA allocated to a VM to a physical address PA, so that the SPM performs IPA-to-PA address translation based on the first address translation relationship when transmitting data from an SP to the VM; and the PA is a memory address ⸺ 501

FIG. 5

METHOD FOR CONFIGURING ADDRESS TRANSLATION RELATIONSHIP, AND COMPUTER SYSTEM

CROSS-REFERENCE TO RELATED APPLICATIONS

This application is a continuation of International Application No. PCT/CN2021/130316, filed on Nov. 12, 2021, which claims priority to Chinese Patent Application No. 202011265320.1, filed on Nov. 12, 2020. The disclosures of the aforementioned applications are hereby incorporated by reference in their entireties.

TECHNICAL FIELD

This application relates to the computer field, and in particular, to a method for configuring an address translation relationship and a computer system.

BACKGROUND

As a representative security framework of a terminal device, an ARM (advanced RISC machines) emerges to ensure security of the terminal device (where the English full name of an RISC is a reduced instruction set computer). In the ARM framework, system-level security is obtained by dividing a software resource and a hardware resource of a system on chip (system on chips, SoC) into two worlds. The two worlds are a normal world (normal world) and a secure world (secure world) (which may also be referred to as a secure domain and a non-secure domain). The two worlds respectively correspond to a rich execution environment (rich execution environment, REE) and a trusted execution environment (trusted execution environment, TEE). The REE and the TEE run on a same physical device, and one operating system is run in each of the REE and the TEE. A client application (client application, CA) that has a low security requirement is run in the REE. A trusted application (trusted application, TA) whose security needs to be ensured is run in the TEE, and the TEE provides a secure execution environment for an authorized trusted application TA. The CA communicates with the TA according to a provided communication mechanism. This is similar to communication between a client and a server.

As a TRUSTZONE™ technology continuously develops, major vendors tend to use their own trusted operating systems (trusted operating system, TEEos). An ARMv8.4 version introduces a new CPU working mode secure legal exception level 2 (SEL2) to support a hardware virtualization technology on a TEE side. Based on this technology, a virtualization environment may be constructed on the TEE side similar to that on a REE side, a plurality of secure partitions (secure partition, SP) are created, and one TEEos may be run in each SP. A multi-TEEos architecture can resolve a TEEos fragmentation problem and support a plurality of VMs on the REE side.

Currently, a design of a TEEos driver (tzdriver) (a drive of the TRUSTZONE™, which works on a non-secure side and is used for communicating with a secure side) is to deploy the tzdriver on each virtual machine (virtual machine, VM). Shared memory between the VM and the SP is applied for by the tzdriver. In this way, there is a piece of shared memory between each VM and SP pair. A conventional method for establishing shared memory between a VM and an SP is as follows: A VMM (for example, a hypervisor) of an EL2 transfers a possibly discrete physical address (physical address, PA) corresponding to the shared memory to a SEL2 SP monitor (secure partition monitor, SPM), and the SPM maps the PA to IPA space of the SP. The mapped IPA is required to be contiguous. Finally, a TEEos in the SP maps the IPA to a contiguous VA. In this way, the shared memory between the VM and the SP is established. However, usually, the PA transferred by the VMM to the SPM is a discrete address, and the SPM needs to map the discrete PA to the contiguous IPA. When there are a large quantity of VMs/SPs, code complexity and a code amount required for the SPM to perform memory mapping are very high.

SUMMARY

According to a first aspect, this application provides a method for configuring an address translation relationship. The method is applied to a computer system. A rich execution environment REE and a trusted execution environment TEE are deployed in the computer system, a virtual machine VM and a virtual machine manager VMM are deployed in the REE, and a secure partition SP and a secure partition manager SPM are deployed in the TEE. The method includes: The VMM transfers a first address translation relationship to the SPM. The first address translation relationship includes an address translation relationship from an intermediate physical address IPA allocated to the VM to a physical address PA, so that the SPM performs IPA-to-PA address translation based on the first address translation relationship when transmitting data from the SP to the VM. The PA is a memory address.

An address sent by an operating system in kernel space or a user program in user program space may be referred to as a VA, or in other words, an address visible to the operating system or the user program is a VA. A real address of a memory chip is referred to as a PA, and an address used in a process in which the VA is mapped to the PA may be referred to as an IPA.

After receiving the VA, an MMU may map, to the IPA in a stage-1 (stage-1) memory address translation process, the VA sent by the operating system in the kernel space or the user program in the user program space; and may map the IPA to the PA in a stage-2 (stage-2) memory address translation process.

In the stage-2 address translation, a base address of a translation table used by the MMU is specified in a first vttbr_el2. For example, contiguous address space at the bottom of a memory is specified in the first vttbr_el2 as the base address in the translation table.

In the stage-2 address translation, a part of memory address translation rules used by the MMU are specified in a first vtcr_el2, and an address translation attribute used for the stage-2 memory address translation on a REE side is configured in the first vtcr_el2. The address translation attribute may specify but is not limited to a size of a memory page, and the address translation attribute may be specified by a part of bits (bits) in the vtcr_el2, for example, PS, TG0, SH0, IRGN0, ORGN0, RES0, SL0, and T0SZ.

In this embodiment of this application, the PA obtained from translation of the IPA allocated to the VM according to an address translation rule may be used as shared memory between the VM and the SP. To enable the SP side to use the same shared memory, the PA of the shared memory should be transferred to the SP side after the VM side applies for the shared memory. In this way, the SP side can perform data interaction with the VM based on the memory corresponding to the same PA. In an existing implementation, a hypervisor may directly transfer the PA to the SPM on the SP side, and then the SPM itself configures mapping from the IPA on the SP side to the PA. In this embodiment of this application, the hypervisor may transfer the first address translation relationship to the SPM. The first address translation relationship includes the address translation relationship from the intermediate physical address IPA allocated to the VM to the physical address PA, so that the SPM performs the IPA-to-PA address translation based on the first address translation relationship when transmitting the data from the SP to the VM. The PA is the memory address. That is, in this embodiment, the SPM on the TEE side directly uses an IPA-to-PA address mapping relationship (the first address translation relationship) configured on the VM side as an address translation relationship on the SP side. During subsequent data interaction with the VM, the SPM may directly perform IPA-to-PA mapping based on the first address translation relationship, and does not need to re-construct a PA-to-IPA address translation relationship in the stage-2 (stage-2) memory address translation process.

Available shared memory (the physical address PA) configured on the VM side for different VM/SP pairs is isolated from each other. In this embodiment of this application, the SPM may reuse the IPA-to-PA address translation relationship on the VM side, so that shared memory in a data interaction process between different SPs/VMs is isolated from each other. In addition, because the SPM directly reuses the IPA-to-PA address translation relationship on the VM side, a process in which the SPM establishes an IPA-to-VA address mapping relationship is simplified.

In a possible implementation, the IPA allocated to the VM is a contiguous address, and the PA obtained by performing, based on the first address translation relationship, address translation on the IPA allocated to the VM is a discrete address. Generally, the PA transferred by the VMM to the SPM is a discrete address, and the SPM needs to map the discrete PA to the contiguous IPA. When there are a large quantity of VMs/SPs, code complexity and a code amount required for the SPM to perform memory mapping are very high. However, in this embodiment, because the SPM directly reuses the IPA-to-PA address translation relationship on the VM side, a process in which the SPM establishes the IPA-to-VA address mapping relationship is simplified.

In a possible implementation, a first virtualization translation table base address register vttbr_el2 and a first control register vtcr_el2 are deployed in the REE. The first address translation relationship includes: a base address of a page table that is configured in the first vttbr_el2 and that is used for performing the stage-2 memory address translation (stage 2 translation) on the REE side, the address translation attribute that is configured in the first vtcr_el2 and that is used for performing the stage-2 memory address translation on the REE side, and the IPA allocated to the VM. The IPA allocated to the VM may be translated into the PA based on the base address and a memory translation rule expressed by the address translation attribute.

In a possible implementation, the method further includes: The SPM transfers the IPA allocated to the VM to the SP. The SP is configured to establish a second address mapping relationship based on the IPA allocated to the VM, and a second address translation relationship includes an address translation relationship from a virtual address VA to an IPA, so that the SP performs VA-to-IPA address translation based on the second address mapping relationship when transmitting the data to the VM.

The SP may establish, based on the IPA allocated to the VM in a first address mapping relationship, page table mapping of the stage-1 stage-1 memory address translation corresponding to the shared memory, and set an ns bit in a page table entry to 1, to ensure that when the VA corresponding to the shared memory performs MMU translation, the second vttbr_el2 is automatically selected as a page table base address register in the stage-2, and to perform translation by using a non-secure stage-2 page table. When a TEEos in the SP needs to access secure memory, the vsttbr_el2 is automatically selected as the base address in the stage-2 address translation because the ns bit in the corresponding stage-1 page table entry is set to 0.

In a possible implementation, the second vttbr_el2 and a second vtcr_el2 are deployed in the TEE. The method further includes: The SPM writes the base address to the second vttbr_el2, and writes the address translation attribute to the second vtcr_el2, so that the SPM performs the IPA-to-PA address translation based on the base address stored in the second vttbr_el2 and the address translation attribute stored in the second vtcr_el2 when transmitting the data from the SP to the VM.

In this embodiment of this application, the second vttbr_el2 and the second vtcr_el2 are deployed in the TEE. The SPM may write the base address to the second vttbr_el2, and write the address translation attribute to the second vtcr_el2, so that the SPM performs the IPA-to-PA address translation based on the base address stored in the second vttbr_el2 and the address translation attribute stored in the second vtcr_el2 when transmitting the data from the SP to the VM.

In an implementation, after the VM on the REE side is started, the SPM may receive a start request sent by the hypervisor, to start the SP corresponding to the VM on the TEE side. In addition to indicating to start the SP on the TEE side, the start request further indicates the SPM to start the SP, and the SPM writes the base address to the second vttbr_el2 and writes the address translation attribute to the second vtcr_el2 when starting the SP.

In an implementation, after applying for a contiguous IPA used by the VM, the VM (which may be specifically a tzdriver) transfers the contiguous IPA to the SPM by using a general-purpose register, and then the SPM writes the base address to the second vttbr_el2 and writes the address translation attribute to the second vtcr_el2.

In a possible implementation, before the SPM writes the base address to the second vttbr_el2, and writes the address translation attribute to the second vtcr_el2, the method further includes: The SPM receives a start request sent by the VMM, where the start request indicates the SPM to start the SP; and writes the base address to the second vttbr_el2 and writes the address translation attribute to the second vtcr_el2 when starting the SP.

In a possible implementation, that the VMM transfers a first address translation relationship to the SPM includes:

The VMM writes the first address translation relationship to the general-purpose register, and triggers, based on an SMC instruction, the SPM to obtain the first address translation relationship from the general-purpose register.

Specifically, the hypervisor may write, to the general-purpose register, the base address of the page table that is configured in the first vttbr_el2 and that is used for performing the stage-2 memory address translation on the REE side, the address translation attribute that is configured in the first vtcr_el2 and that is used for performing the stage-2 memory address translation on the REE side, and the IPA allocated to the VM, and trigger, based on the SMC instruction, the SPM to obtain the information from the general-purpose register. How the SPM obtains the first address translation relationship from the general-purpose register based on triggering of the SMC instruction may be based on the existing implementation, and details are not described herein again.

In an implementation, before the shared memory is established on the TEE side, the hypervisor may write, to the general-purpose register, the base address of the page table that is configured in the first vttbr_el2 and that is used for performing the stage-2 memory address translation on the REE side, and the address translation attribute that is configured in the first vtcr_el2 and that is used for performing the stage-2 memory address translation on the REE side, and trigger, based on the SMC instruction, the SPM to obtain the foregoing information from the general-purpose register.

More specifically, the base address and the address translation attribute may be transferred to the SPM by using the general-purpose register when the VM on the REE side is started and the hypervisor sends the start request to the SP. Alternatively, after applying for the contiguous IPA used by the VM, the VM (which may be specifically the tzdriver) transfers the contiguous IPA to the SPM by using the general-purpose register.

According to a second aspect, this application provides a computer system. A rich execution environment REE and a trusted execution environment TEE are deployed in the computer system, a virtual machine VM and a virtual machine manager VMM are deployed in the REE, and a secure partition SP and a secure partition manager SPM are deployed in the TEE.

The VMM is configured to transfer a first address translation relationship to the SPM. The first address translation relationship includes an address translation relationship from an intermediate physical address IPA allocated to the VM to a physical address PA, so that the SPM performs IPA-to-PA address translation based on the first address translation relationship when transmitting data from the SP to the VM. The PA is a memory address.

In a possible implementation, the IPA allocated to the VM is a contiguous address, and the PA obtained by performing, based on the first address translation relationship, address translation on the IPA allocated to the VM is a discrete address.

In a possible implementation, a first virtualization translation table base address register vttbr_el2 and a first control register vtcr_el2 are deployed in the REE. The first address translation relationship includes: a base address of a page table that is configured in the first vttbr_el2 and that is used for performing the stage-2 memory address translation (stage 2 translation) on the REE side, the address translation attribute that is configured in the first vtcr_el2 and that is used for performing the stage-2 memory address translation on the REE side, and the IPA allocated to the VM. The IPA allocated to the VM may be translated into the PA based on the base address and a memory translation rule expressed by the address translation attribute.

In a possible implementation, the SPM is configured to transfer the IPA allocated to the VM to the SP. The SP is configured to establish a second address mapping relationship based on the IPA allocated to the VM, and a second address translation relationship includes an address translation relationship from a virtual address VA to an IPA, so that the SP performs VA-to-IPA address translation based on the second address mapping relationship when transmitting the data to the VM.

In a possible implementation, a second vttbr_el2 and a second vtcr_el2 are deployed in the TEE. The SPM is configured to write the base address to the second vttbr_el2, and writes the address translation attribute to the second vtcr_el2, so that the SPM performs the IPA-to-PA address translation based on the base address stored in the second vttbr_el2 and the address translation attribute stored in the second vtcr_el2 when transmitting the data from the SP to the VM.

In a possible implementation, the SPM is configured to receive a start request sent by the VMM, where the start request indicates the SPM to start the SP; and write the base address to the second vttbr_el2 and write the address translation attribute to the second vtcr_el2 when starting the SP.

In a possible implementation, the VMM is configured to: write the first address translation relationship to a general-purpose register, and triggers, based on an SMC instruction, the SPM to obtain the first address translation relationship from the general-purpose register.

According to a third aspect, this application provides a computer system. The computer system includes a memory and a processor. The memory is configured to store computer-readable instructions (or referred to as a computer program), and the processor is configured to read the computer-readable instructions to implement the method provided in any one of the foregoing implementations.

According to a fourth aspect, this application provides a computer storage medium. The computer storage medium may be a non-volatile storage medium. The computer storage medium stores computer-readable instructions. When the computer-readable instructions are executed by a processor, the method provided in any one of the foregoing implementations is implemented.

According to a fifth aspect, this application provides a computer program product. The computer program product includes computer-readable instructions. When the computer-readable instructions are executed by a processor, the method provided in any one of the foregoing implementations is implemented.

An embodiment of this application provides a method for configuring an address translation relationship. The method is applied to a computer system. A rich execution environment REE and a trusted execution environment TEE are deployed in the computer system, a virtual machine VM and a virtual machine manager VMM are deployed in the REE, and a secure partition SP and a secure partition manager SPM are deployed in the TEE. The method includes: The VMM transfers a first address translation relationship to the SPM. The first address translation relationship includes an address translation relationship from an intermediate physical address IPA allocated to the VM to a physical address PA, so that the SPM performs IPA-to-PA address translation based on the first address translation relationship when transmitting data from the SP to the VM. The PA is a memory address. In the foregoing manner, a process in which the SPM establishes an IPA-to-VA address mapping relationship is simplified, and code complexity and a code amount required for the SPM to perform memory address mapping configuration can be reduced.

BRIEF DESCRIPTION OF DRAWINGS

FIG. 4 is a schematic diagram of a structure of an intelligent terminal;

FIG. 5 is a schematic diagram of an exception level defined in an ARM processor;

DESCRIPTION OF EMBODIMENTS

Figure 1:
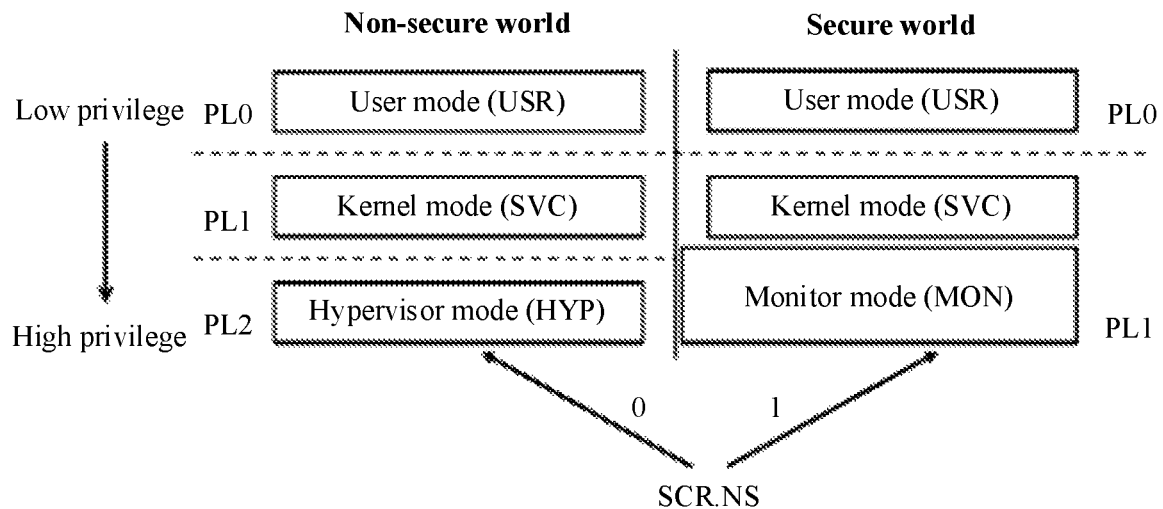
FIG. 1 is a schematic diagram of a hardware architecture according to an embodiment of this application.

The following describes embodiments of this application with reference to the accompanying drawings. It is clear that the described embodiments are merely a part rather than all of embodiments of this application. Persons of ordinary skill in the art may learn that, with technology development and emergence of a new scenario, technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include", "have" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

In addition, in the descriptions of the present invention, unless otherwise stated, "a plurality of" means two or more than two. In this application, a term "and/or" or a character "/" describes only an association relationship between associated objects, and indicates that three relationships may exist. For example, A and/or B, or A/B may indicate the following three cases: Only A exists, both A and B exist, and only B exists.

Rapid development of intelligent mobile terminals brings great convenience to our life. Most mobile terminals run on an ARM central processing unit (central processing unit, CPU). With continuous improvement of ARM CPU performance, ARM CPUs are widely applied to servers. Nowadays, intelligent terminals and cloud servers carry more and more personal information of a user, and the user pays more and more attention to device security. For the ARM CPU, a mainstream system-level solution is a TRUSTZONE™ technology.

As a security extension, the ARM TRUSTZONE™ technology is first introduced in an ARMv6 version, and divides hardware resources into two worlds: a non-secure world (a rich execution environment (rich execution environment, REE) side) and a secure world (a trusted execution environment (trusted execution environment, TEE) side). An operating system closely related to the user works in the non-secure world, and the TRUSTZONE™ works in the secure world as a hardware security feature. The non-secure world does not mean that the operating system or software running in the non-secure world is malicious, but security of an environment where the non-secure world is located is lower than that of the secure world. When a CPU works in the non-secure world, resources (such as a register, a memory, a cache (Cache), and a peripheral) in the secure world cannot be accessed. Once the CPU attempts to access these resources, the system crashes. For example, the TRUSTZONE™ can configure a TZASC (TRUSTZONE™ Address Space Controller) register and a TZMA (TRUSTZONE™ Memory Adapter) register, and set sensitive memory to secure memory (secure memory). In this way, the non-secure world cannot access the memory. When the CPU works in the secure world, the CPU can access resources in both the secure and non-secure worlds. The TRUSTZONE™ has a higher permission than the operating system in the non-secure world. Therefore, the TRUSTZONE™ can be used as a trusted root to provide a higher-level security protection solution for the operating system in the non-secure world.

FIG. 1 shows a hardware architecture of an ARMv7. The left is an architecture of a non-secure world. To support CPU hardware virtualization, the ARM newly adds a HYP mode (HYP mode) to two CPU modes: a user mode (USR mode) and a kernel mode (SVC mode). An operating system closely related to a user is run in the user mode and the kernel mode of the non-secure world, and the hypervisor is run in the newly added HYP mode. The HYP mode is a CPU mode with a highest permission in the non-secure world. When a CPU works in this mode, the CPU can access all hardware resources in the user mode, the kernel mode, and the HYP mode. However, when the CPU works in the other two modes, the CPU cannot access HYP-related hardware resources. Therefore, the hypervisor has a higher permission than the operating system. Similar to the non-secure world, a secure world on the right also includes two CPU working modes: a user mode and a kernel mode. In the ARMv7, the secure world does not support hardware virtualization. Therefore, the secure world does not include a HYP mode. However, in a latest ARMv8.4 architecture, the secure world starts to support hardware virtualization. The secure world also includes a special CPU mode that has a highest permission: a monitor mode (Monitor mode). The monitor mode is a mode with a highest CPU permission. When a CPU works in this mode, the CPU can access all hardware resources in both the secure and non-secure worlds. TRUSTZONE™ can initialize and activate the hypervisor by configuring a hypervisor-related control register in the monitor mode. The monitor mode is also a portal for the non-secure world to enter the secure world. In the kernel mode or HYP mode of the non-secure world, an SMC (Secure Monitor Call) instruction is executed to actively switch from the non-secure world to the monitor mode of the secure world. When an ERET instruction is executed in the monitor mode, the CPU determines whether to return to the non-secure world or stay in the secure world by checking an NS (non-secure) bit of a SCR (Secure Control Register). When the NS bit is set to 1, a return operation in the monitor mode returns to a kernel in the non-secure world and performs a world switch (world switch) operation. When the NS bit is set to 0, the return operation in the monitor mode returns to a kernel in the secure world and does not perform the world switch operation.

Figure 2:
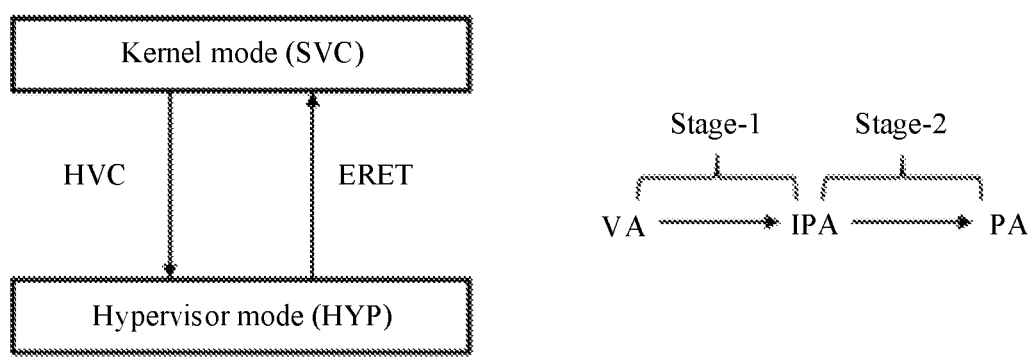
FIG. 2 is a schematic diagram of executing an instruction in a kernel mode.

As a virtualization extension of the ARM, the hypervisor is first introduced in the ARMv7. As shown in FIG. 1, the non-secure world includes three permission levels: a PL0, a PL1, and a PL2. The hypervisor works in the PL2 with a highest permission level in the non-secure world. Executing an HVC (Hypervisor Call) instruction in the kernel mode of the non-secure world is a common way to enter the hypervisor. Return to the kernel mode by executing the ERET instruction in the HYP mode (as shown in FIG. 2). To support memory virtualization, the ARM introduces a memory virtualization technology of stage-2 memory address translation (Stage-2 translation). A common one-stage memory address translation from a virtual address to a physical address (VA→PA) is converted into two-stage memory address translation from a virtual address to an intermediate physical address (IPA), and then from the intermediate physical address to a physical address (VA→IPA→PA) by using this technology. The stage-2 memory address translation (IPA→PA) process is completely controlled by the hypervisor and is transparent to the operating system. For the operating system, the IPA is a "physical address" used by the operating system.

For memory virtualization support, a design on a TEE side is slightly different from that on a REE side. The TEE side has two stage-2 base address registers: a vttbr_el2 and a vsttbr_el2. The REE side has only one stage-2 base address register: the vttbr_el2. In a stage-1 translation process, if an NS bit in a page table entry is 1, a memory management unit (memory management unit, MMU) selects the vttbr_el2 as the base address register for stage-2 translation. If an NS bit in the page table entry is 0, the MMU selects the vsttbr_el2 as the base address register for stage-2 translation. This process is automatically completed by the MMU, and no software is required. The vttbr_el2 and vsttbr_el2 registers are designed to enable the CPU to access secure memory or non-secure memory when the CPU works on the TEE side. The secure memory and non-secure memory can be distinguished by using the two sets of stage-2 page tables. By configuring, the system can ensure that a physical address translated by using the stage-2 page table pointed by the vttbr_el2 is in the non-secure memory, and a physical address translated by using the vsttbr_el2 page table is in the secure memory.

The following describes a scenario architecture to which this application is applied.

Figure 3:
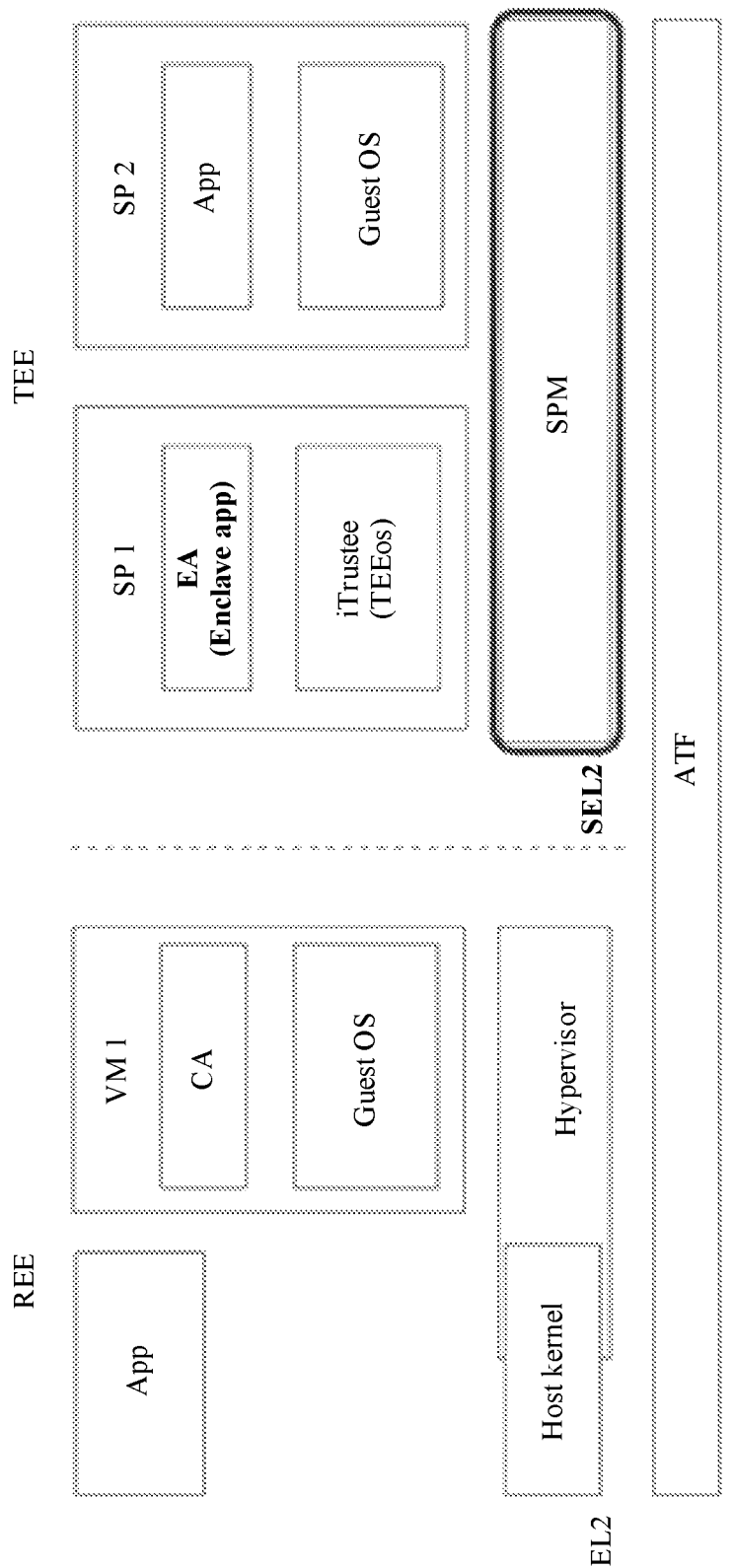
FIG. 3 is a schematic diagram of a structure of an ARM architecture-based server.

This application may be applied to an ARM architecture-based server. In an ARM-based server scenario, both a rich execution environment REE and a trusted execution environment TEE support a hardware virtualization feature, and a tenant establishes a plurality of VMs on an REE side. To provide support for the TEE trusted execution environment for each tenant, when the VM is started, a secure partition SP is correspondingly started on a TEE side, and a TEEos is started in the SP, to support a security service in the VM. An architecture of the server is shown in FIG. 3. During running, a CA (a client application program that can invoke a TEE service and that is run on the REE side) in the VM requests a security service of a TA (a trusted application program that is run on the TEE side) in the SP.

This application may be further applied to an intelligent terminal (for example, a portable device such as a smartphone). As shown in FIG. 4, in a scenario of an intelligent terminal, although a REE and a TEE do not have a strong requirement for starting a plurality of VMs/SPs, after memory virtualization features on the REE side and the TEE side are enabled, it may be considered that a guest system guest OS (for example, Android os) on the REE side is run in the VM, and a TEEos on the TEE side is run in the SP.

This application may be applied to the foregoing server and intelligent terminal, and may be specifically applied to a process in which an SPM on the TEE side configures a memory address translation relationship when shared memory of a VM and an SP is configured.

The server and the intelligent terminal (which may also be referred to as a computer system in embodiments of this application) may include a processor and a memory. The processor may also be referred to as a central processing unit (central processing unit, CPU) or a central processor.

An example of the processor in the computer system is a reduced instruction system (Advanced RISC Machines, ARM) processor. An example of the memory in the computer is a random access memory (random access memory, RAM) or a flash memory (Flash). The RAM may also be referred to as a main memory or a memory. The memory has an access permission attribute, for example, read-only, writable, executable, and inaccessible.

A virtualization technology is used in the processor of the computer system. The virtualization technology can hide underlying physical hardware of the computer, so that a plurality of operating systems (operator system, OS) running independently can transparently use and share a hardware resource of the computer. Simply speaking, the virtualization technology may enable the computer to concurrently run the plurality of OSs.

The processor in the computer provides different permission levels for program code to gain access to a resource on the computer, to protect data on the computer and prevent malicious behavior from occurring on the computer, thereby ensuring computer security.

For example, as shown in FIG. 5, four exception levels (Exception levels, EL) may be defined in an ARM processor: an EL0, an EL1, an EL2, and an EL3. A larger value indicates a higher exception level, and a smaller value indicates a lower exception level. For example, a level of the EL0 is lower than a level of the EL1, the level of the EL1 is lower than a level of the EL2, and the level of the EL2 is lower than a level of the EL3. Certainly, the larger value may indicate the lower exception level, and the smaller value may indicate the higher exception level. This is not limited in the embodiments of this application.

Different exception levels correspond to different levels of running space. Division into the exception level or division into the running space provides logically separated execution permission for all operating software in the processor. It should be understood that the exception level in this application is similar to a common classified protection domain in computer science, and supports a concept related to the classified protection domain.

The following is an example of software running at each of the four exception levels: A common user application program is run in running space corresponding to the EL0. An operating system kernel, for example, LINUX™ or WINDOWS™, may be run in running space corresponding to the EL1, and the operating system kernel is generally considered to have a privilege. A management program (the hypervisor) is run in running space corresponding to the EL2. Low-level firmware, for example, a security monitor, is run in running space corresponding to the EL3. The hypervisor may also be referred to as a super manager. The management program in an enabled state may provide a virtualization service for one or more operating system kernels.

The firmware (such as ARM trusted firmware) is first run when the processor starts. The firmware provides many services, for example, initializing a platform, installing a trusted operating system, and routing a command from the security monitor. In the processor of the computer, a CPU execution unit may manage the memory or perform memory access by using a memory management unit (memory management unit, MMU). For example, the MMU can perform operations such as mapping an address and providing memory access authorization.

In the processor, when program code running in running space corresponding to different exception levels performs memory access, the MMU performs different address mapping and different memory access authorization procedures.

Figure 6:
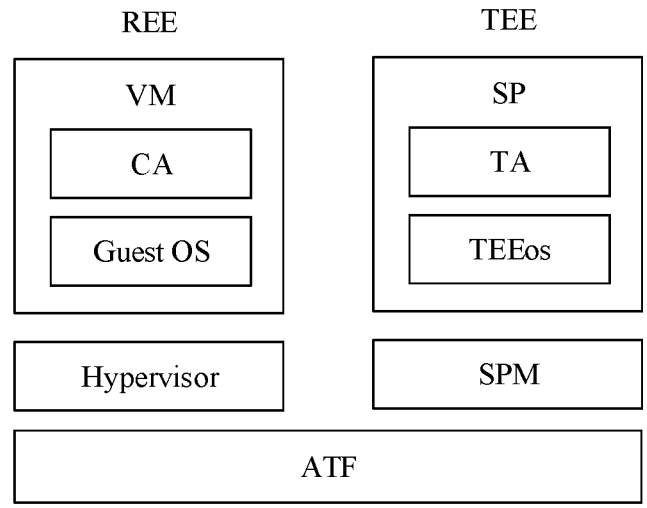
FIG. 6 is a schematic flowchart of a method for configuring an address translation relationship according to an embodiment of this application.

FIG. 5 is a schematic flowchart of a method for configuring an address translation relationship according to an embodiment of this application. The method for configuring an address translation relationship provided in this embodiment of this application may be applied to a computer system. As shown in FIG. 6, a rich execution environment REE and a trusted execution environment TEE may be deployed in the computer system provided in this application, a virtual machine VM and a virtual machine manager VMM (for example, the VMM may be a hypervisor shown in FIG. 6, and an example in which the VMM is the hypervisor is also used for description in the following embodiments) are deployed in the REE, and a secure partition SP and a secure partition manager SPM are deployed in the TEE.

The VMM is equivalent to a hypervisor or another type of virtual monitoring apparatus in a virtualization architecture. The VMM may be deployed inside a host machine operating system or may be separately deployed from the host machine operating system. The VMM is responsible for managing one or more virtual machines running on the VMM.

The virtual machine (VM) includes a guest operating system (Guest OS) and a plurality of applications (including a CA). The virtual machine VM may include a container (container), and the container is equivalent to an application. In some other embodiments, a virtualization layer is implemented by using a lightweight virtualization technology, for example, libOS. One libOS usually includes one application. The entire libOS includes one or more libraries, which are linked to the application to form a single-address space image. In embodiments of this application, a virtual machine implemented by using a conventional virtualization technology is usually used as an example. For another type of virtualization architecture, refer to an implementation of the virtual machine.

An ARMv8.4 version introduces a new CPU working mode SEL2 to support a hardware virtualization technology on the TEE side. Based on this technology, a virtualization environment may be constructed on the TEE side similar to that on a REE side, a plurality of SPs (Secure Partition) are created, and a TEEos and a TA may be run in each SP.

There are a plurality of forms for creating the VM and the SP. For example, each time a VM is started on the REE side, a corresponding SP is started on the TEE side, and the VM interacts with the corresponding SP during running. Alternatively, a plurality of SPs are started on the TEE side, and then the VM is started on the REE. During running, the VM selects one of the SPs for interaction. Regardless of which creation manner is used, interaction between the CA in the VM and the TA in the SP needs to use shared memory to transmit and receive data during running.

The method for configuring an address translation relationship provided in this embodiment of this application may include the following steps.

501: The VMM transfers a first address translation relationship to the SPM, where the first address translation relationship includes an address translation relationship from an intermediate physical address IPA allocated to the VM to a physical address PA, so that the SPM performs IPA-to-PA address translation based on the first address translation relationship when transmitting data from the SP to the VM; and the PA is a memory address.

In this embodiment of this application, after the computer system is powered on, ARM trusted firmware (ARM trusted firmware, ATF) in the computer system may be first initialized. After initialization of the ATF is completed, an execution logic may jump to the SEL2 and complete initialization of the SPM (it should be noted that one SPM is implemented by using the ARM in the EL3 in a form of software, and the SPM may support running of two TEEoss on the TEE side). After SEL2 initialization is completed, the execution logic may return to the REE side to initialize the EL2 hypervisor.

After initialization of the hypervisor is completed, an IPA-to-PA address translation rule may be established. When the VM applies for the shared memory used for interaction with the SP, a tzdriver located in a guest OS of the VM may apply for the shared memory between the VM and the SP, so that each VM and SP pair has the shared memory. The shared memory between different VM/SP pairs is isolated from each other. The tzdriver is a driver of TRUSTZONE™ and works in REE for communication with a security side. One tzdriver can be deployed on each VM. Specifically, the tzdriver may apply for and obtain a segment of contiguous IPAs as the IPA allocated to the VM. In a subsequent process of data interaction between the VM and the corresponding SP, the IPA allocated to the VM may be translated into the PA, and the PA obtained through translation is used as the shared memory between the VM and the SP.

In this embodiment of this application, after the tzdriver applies for a segment of contiguous IPAs for the VM in which the tzdriver is located, the hypervisor may determine that the contiguous IPA is allocated to the VM, and may determine the PA obtained through translation as the shared memory between the VM and the SP. The guest OS may further configure a VA-to-IPA address translation relationship in a stage-1 memory address translation process. Specifically, the guest OS may map the contiguous IPA obtained by the tzdriver through application to a VA, to establish the VA-to-IPA address translation relationship. In a process of transferring data from the VM to the SP, an MMU may obtain, based on a VA sent by a guest OS in kernel space or a user program in user program space, a corresponding IPA through stage-1 memory address translation, obtain a corresponding PA through stage-2 memory address translation, and use the PA as the shared memory between the VM and the SP, to implement data transfer to the SP.

An address sent by the operating system in the kernel space or the user program in the user program space may be referred to as the VA, or in other words, an address visible to the operating system or the user program is the VA. A real address of a memory chip is referred to as the PA, and an address used in a process in which the VA is mapped to the PA may be referred to as the IPA.

More specifically, a first virtualization translation table base address register (virtualization translation table base register, vttbr)_el2 and a first control register vtcr_el2 are deployed in the REE. The hypervisor may configure, in the first vttbr_el2, a base address of a page table used for performing the stage-2 memory address translation (stage 2 translation) on the REE side, and configure, in the first vtcr_el2, an address translation attribute used for performing the stage-2 memory address translation on the REE side. In a process of the stage-2 memory address translation, the hypervisor may translate to-be-translated IPA to obtain a corresponding PA based on the base address and the address translation attribute.

Figure 7:
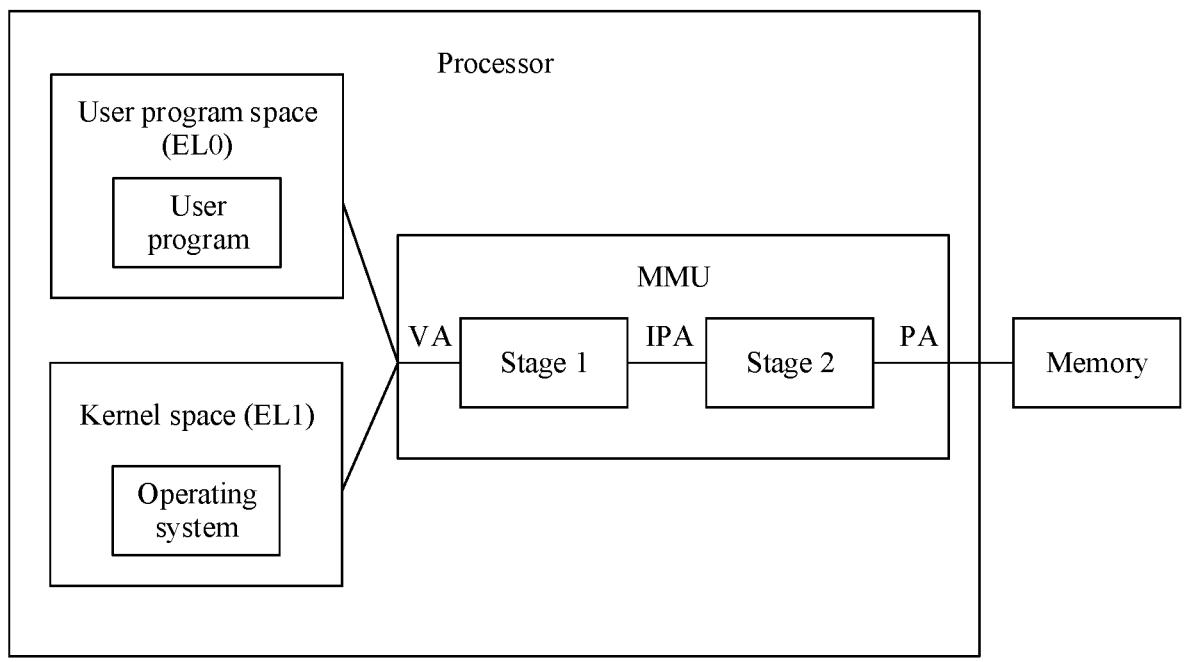
FIG. 7 is a schematic flowchart of memory address translation.

As shown in FIG. 7, after receiving the VA, the MMU may map, to the IPA in the stage-1 (stage-1) memory address translation process, the VA sent by the operating system in the kernel space or the user program in the user program space; and may map the IPA to the PA in the stage-2 (stage-2) memory address translation process.

In the stage-2 address translation, a base address of a translation table used by the MMU is specified in the first vttbr_el2. For example, contiguous address space at the bottom of a memory is specified in the first vttbr_el2 as the base address in the translation table.

Figure 8:
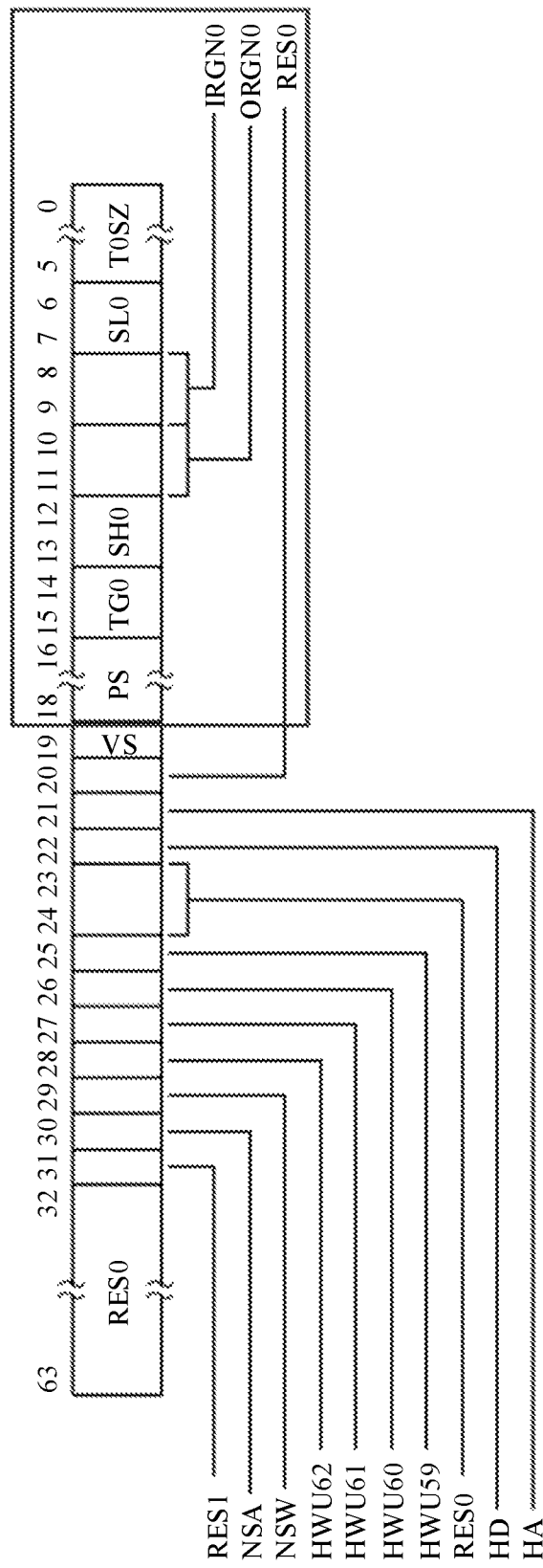
FIG. 8 is a schematic diagram of an address translation attribute according to an embodiment of this application.

In the stage-2 address translation, a part of memory address translation rules used by the MMU are specified in the first vtcr_el2, and the address translation attribute used for the stage-2 memory address translation on the REE side is configured in the first vtcr_el2. The address translation attribute may specify but is not limited to a size of a memory page. As shown in FIG. 8, the address translation attribute may be specified by a part of bits in the vtcr_el2, for example, PS, TG0, SHO, IRGN0, ORGN0, RES0, SL0, and T0SZ.

In this embodiment of this application, the PA obtained from translation of the IPA allocated to the VM according to the address translation rule may be used as the shared memory between the VM and the SP. To enable the SP side to use the same shared memory, the PA of the shared memory should be transferred to the SP side after the VM side applies for the shared memory. In this way, the SP side can perform data interaction with the VM based on the memory corresponding to the same PA. In an existing implementation, the hypervisor may directly transfer the PA to the SPM on the SP side, and then the SPM itself configures mapping from the IPA on the SP side to the PA. In this embodiment of this application, the hypervisor may transfer the first address translation relationship to the SPM. The first address translation relationship includes the address translation relationship from the intermediate physical address IPA allocated to the VM to the physical address PA, so that the SPM performs the IPA-to-PA address translation based on the first address translation relationship when transmitting the data from the SP to the VM. The PA is the memory address.

That is, in this embodiment, the SPM on the TEE side directly uses an IPA-to-PA address mapping relationship (the first address translation relationship) configured on the VM side as an address translation relationship on the SP side. During subsequent data interaction with the VM, the SPM may directly perform IPA-to-PA mapping based on the first address translation relationship, and does not need to reconstruct a PA-to-IPA address translation relationship in the stage-2 (stage-2) memory address translation process.

The following first describes how the hypervisor transfers the first address translation relationship to the SPM, and how the SPM configures, based on the first address translation relationship after receiving the first address translation relationship, a translation page table related to the stage-2 (stage-2) memory address translation.

In an implementation, the hypervisor may write the first address translation relationship to a general-purpose register, and trigger, based on an SMC instruction, the SPM to obtain the first address translation relationship from the general-purpose register.

In this embodiment of this application, the first address translation relationship includes: the base address of the page table that is configured in the first vttbr_el2 and that is used for performing the stage-2 memory address translation on the REE side, the address translation attribute that is configured in the first vtcr_el2 and that is used for performing the stage-2 memory address translation on the REE side, and the IPA allocated to the VM. The IPA allocated to the VM may be translated into the PA based on the base address and a memory translation rule expressed by the address translation attribute.

Specifically, the hypervisor may write, to the general-purpose register, the base address of the page table that is configured in the first vttbr_el2 and that is used for performing the stage-2 memory address translation on the REE side, the address translation attribute that is configured in the first vtcr_el2 and that is used for performing the stage-2 memory address translation on the REE side, and the IPA allocated to the VM, and trigger, based on the SMC instruction, the SPM to obtain the information from the general-purpose register. How the SPM obtains the first address translation relationship from the general-purpose register based on triggering of the SMC instruction may be based on the existing implementation, and details are not described herein again.

In an implementation, before the shared memory is established on the TEE side, the hypervisor may write, to the general-purpose register, the base address of the page table that is configured in the first vttbr_el2 and that is used for performing the stage-2 memory address translation on the REE side, and the address translation attribute that is configured in the first vtcr_el2 and that is used for performing the stage-2 memory address translation on the REE side, and trigger, based on the SMC instruction, the SPM to obtain the foregoing information from the general-purpose register.

More specifically, the base address and the address translation attribute may be transferred to the SPM by using the general-purpose register when the VM on the REE side is started and the hypervisor sends a start request to the SP. Alternatively, after applying for the contiguous IPA used by the VM, the VM (which may be specifically the tzdriver) transfers the contiguous IPA to the SPM by using the general-purpose register.

The following first describes how the hypervisor configures, based on the first address translation relationship, the translation page table related to the stage-2 (stage-2) memory address translation.

In this embodiment of this application, the second vttbr_el2 and the second vtcr_el2 are deployed in the TEE. The SPM may write the base address to the second vttbr_el2, and write the address translation attribute to the second vtcr_el2, so that the SPM performs the IPA-to-PA address translation based on the base address stored in the second vttbr_el2 and the address translation attribute stored in the second vtcr_el2 when transmitting the data from the SP to the VM.

In an implementation, after the VM on the REE side is started, the SPM may receive the start request sent by the hypervisor, to start the SP corresponding to the VM on the TEE side. In addition to indicating to start the SP on the TEE side, the start request further indicates the SPM to start the SP, and the SPM writes the base address to the second vttbr_el2 and writes the address translation attribute to the second vtcr_el2 when starting the SP.

In an implementation, after applying for a contiguous IPA used by the VM, the VM (which may be specifically the tzdriver) transfers the contiguous IPA to the SPM by using the general-purpose register, and then the SPM writes the base address to the second vttbr_el2 and writes the address translation attribute to the second vtcr_el2.

In this embodiment of this application, a base address of the second vttbr_el2 of the SP on the TEE side and a base address of the first vttbr_el2 of the corresponding VM on the REE side is configured to be the same, so that the SP and the VM share a non-secure stage-2 page table. The IPA transferred from the VM to the SP may be directly applicable to the SP, so that the IPA-to-PA address translation in the SP is consistent with a IPA-to-PA memory address translation rule in the VM.

Figure 9:
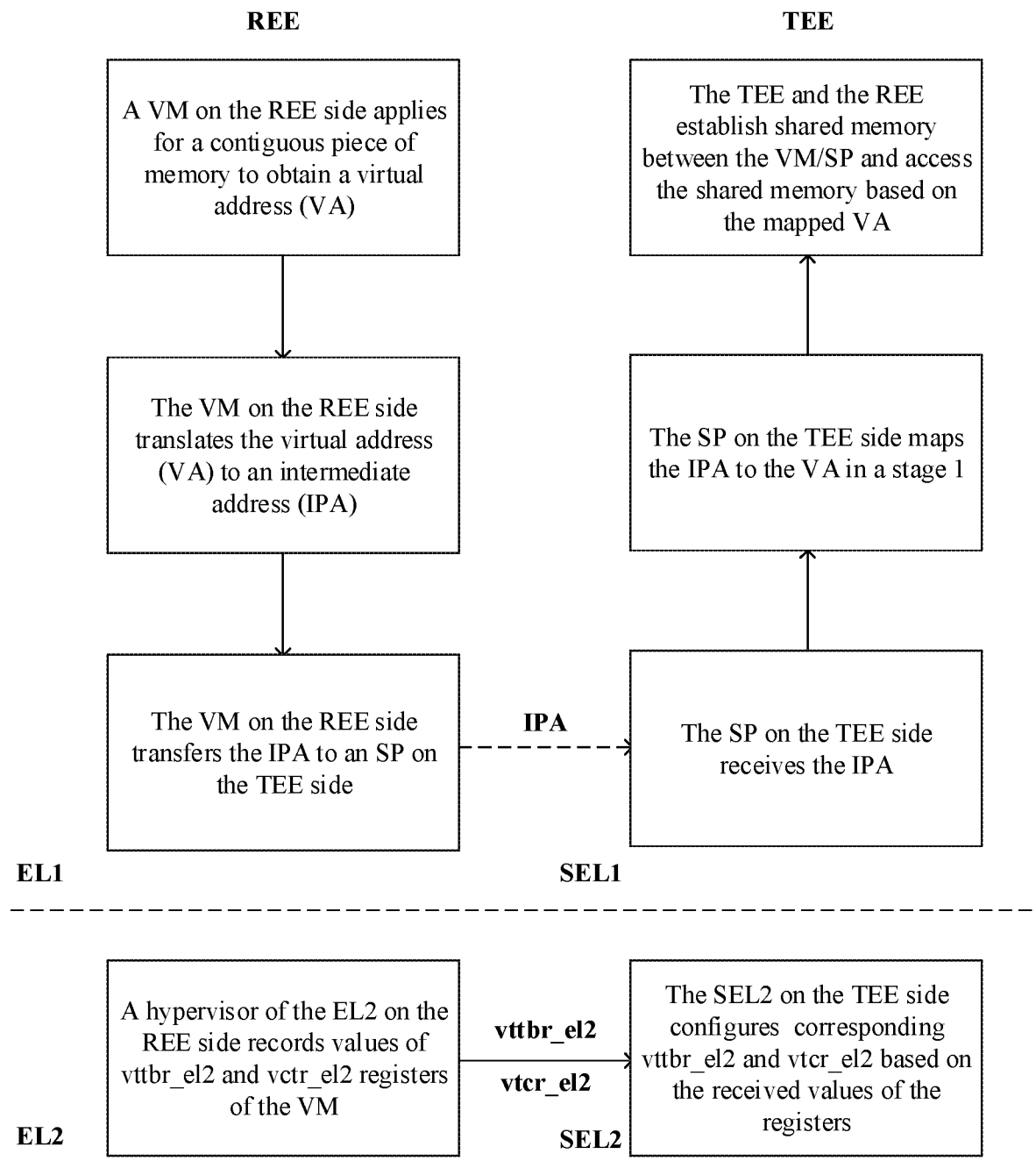
FIG. 9 is a schematic flowchart of a method for configuring an address translation relationship according to an embodiment of this application.

In this embodiment of this application, refer to FIG. 9, the SPM may transfer the IPA allocated to the VM to the SP. The SP is configured to establish a second address mapping relationship based on the IPA allocated to the VM, and a second address translation relationship includes an address translation relationship from a virtual address VA to an IPA, so that the SP performs VA-to-IPA address translation based on the second address mapping relationship when transmitting the data to the VM. The SP may establish, based on the IPA allocated to the VM in a first address mapping relationship, page table mapping of the stage-1 stage-1 memory address translation corresponding to the shared memory, and set an ns bit in a page table entry to 1, to ensure that when the VA corresponding to the shared memory performs MMU translation, the second vttbr_el2 is automatically selected as a page table base address register in the stage-2, and to perform translation by using a non-secure stage-2 page table. When a TEEos in the SP needs to access secure memory, the vsttbr_el2 is automatically selected as the base address in the stage-2 address translation because the ns bit in the corresponding stage-1 page table entry is set to 0.

In addition, to sharing the stage-2 page table, the second vtcr_el2 in the SP also needs to have a same configuration as the first vtcr_el2 in the VM. Therefore, it is required that the hypervisor of the EL2 may further transfer a value (the address translation attribute) of the first vtcr_el2 of the VM to the SPM, so that the SPM writes the address translation attribute to the second vtcr_el2.

It should be understood that, in a process of configuring the second vtcr_el2, the two bits NSA and NSW on the second vtcr_el2 have little meaning for the VM on the REE side, but have the following meaning for the SP on the TEE side: When the NSA is 0, a physical address translated by using the page table to which the second vttbr_el2 points is in the secure memory; when NSA is 1, the translated physical address is in the non-secure memory. For the scenario in this embodiment of this application, the NSA in the second vtcr_el2 on the TEE side needs to be configured to 1. When the NSW is 0, the page table to which the second vttbr_el2 points needs to be stored in the secure memory. When the NSW is 1, the page table needs to be stored in the non-secure memory. Similarly, for the scenario in this embodiment of this application, the NSW in the second vtcr_el2 on the TEE side needs to be set to 1. Therefore, on the basis that the address translation attribute of the second vtcr_el2 register of the SP is configured to be the same as that of the first vtcr_el2 of the corresponding VM, the two bits of the NSA of the vtcr_el2 and the NSW of the vtcr_el2 need to be set to 1.

In an implementation, the IPA allocated to the VM is a contiguous address, and the PA obtained by performing, based on the first address translation relationship, address translation on the IPA allocated to the VM is a discrete address.

Figure 10:
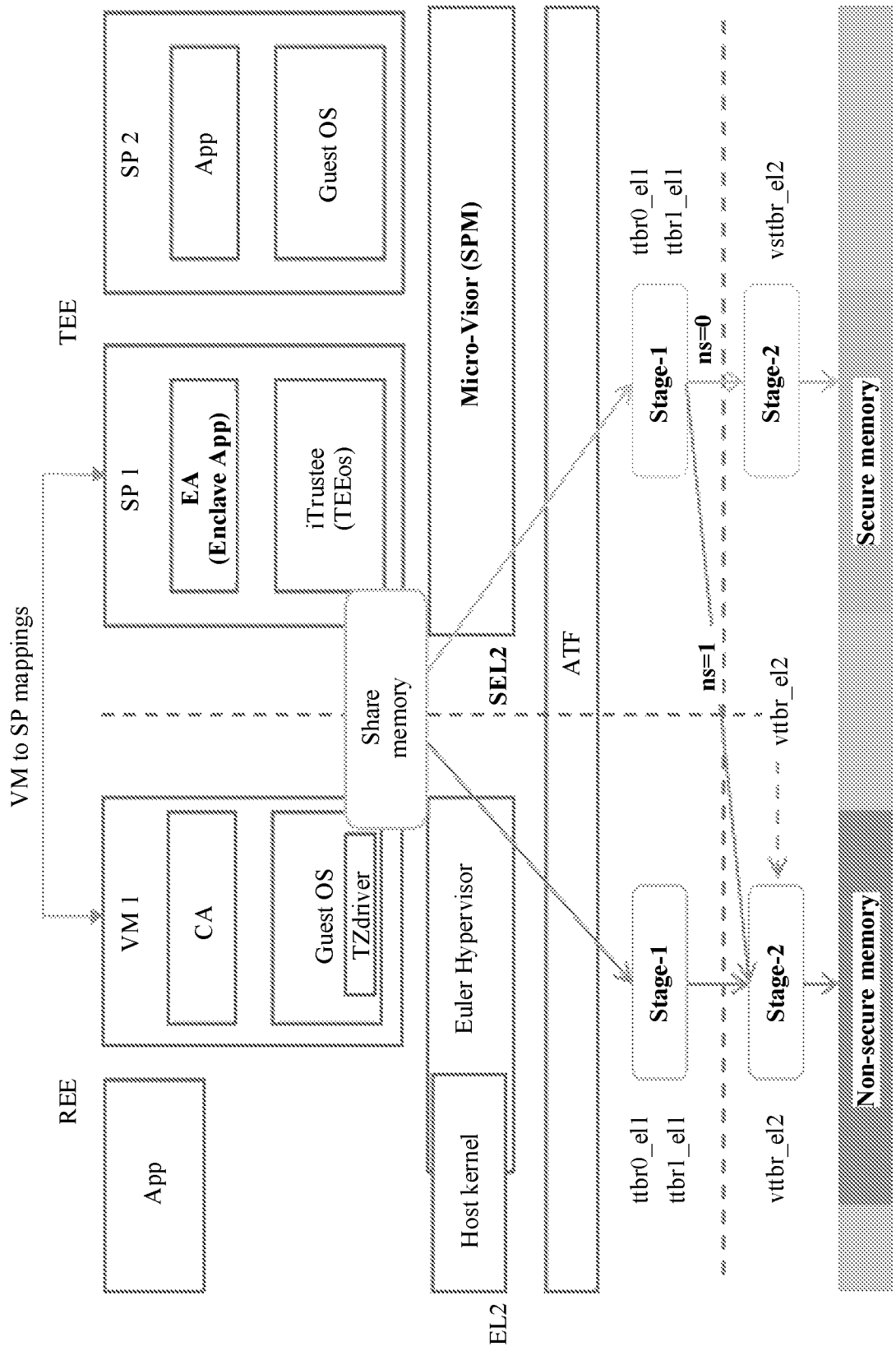
FIG. 10 is a schematic flowchart of a method for configuring an address translation relationship according to an embodiment of this application.

Refer to FIG. 10, a stage-2 MMU on a TEE side has two base address registers: a second vttbr_el2 and a second vsttbr_el2 (marked as vttbr_el2 and vsttbr_el2 in the figure). The second vttbr_el2 and the second vsttbr_el2 respectively correspond to non-secure address translation and secure address translation. Physical memory translated by using the vttbr_el2 is in non-secure memory, and physical memory translated by the vsttbr_el2 is in secure memory. In a process in which a VM transfers data to an SP, in a stage 1, the MMU may perform address translation based on a ttbr0_el1 and a ttbr1_el1 on a REE side, and in a stage 2, the MMU may perform address translation based on a vttbr_el2 on the REE side. In a process in which the SP transfers data to the VM, in a stage 1, address translation may be performed based on a ttbr0_el1 and a ttbr1_el1 on the TEE side, and in a stage 2, address translation may be performed based on a vttbr_el2 on the TEE side.

In this embodiment of this application, available shared memory (a physical address PA) configured on the VM side for different VM/SP pairs is isolated from each other. In this embodiment of this application, an SPM may reuse an IPA-to-PA address translation relationship on the VM side, so that shared memory in a data interaction process between different SPs/VMs is isolated from each other. In addition, because the SPM directly reuses the IPA-to-PA address translation relationship on the VM side, a process in which the SPM establishes an IPA-to-VA address mapping relationship is simplified.

An embodiment of this application provides a method for configuring an address translation relationship. The method is applied to a computer system. A rich execution environment REE and a trusted execution environment TEE are deployed in the computer system, a virtual machine VM and a virtual machine manager VMM are deployed in the REE, and a secure partition SP and a secure partition manager SPM are deployed in the TEE. The method includes: The VMM transfers a first address translation relationship to the SPM. The first address translation relationship includes an address translation relationship from an intermediate physical address IPA allocated to the VM to a physical address PA, so that the SPM performs IPA-to-PA address translation based on the first address translation relationship when transmitting data from the SP to the VM. The PA is a memory address. A process in which the SPM establishes an IPA-to-VA address mapping relationship is simplified by using the foregoing manner.

An embodiment of this application further provides a computer system. A rich execution environment REE and a trusted execution environment TEE are deployed in the computer system, a virtual machine VM and a virtual machine manager VMM are deployed in the REE, and a secure partition SP and a secure partition manager SPM are deployed in the TEE. The VMM is configured to transfer a first address translation relationship to the SPM. The first address translation relationship includes an address translation relationship from an intermediate physical address IPA allocated to the VM to a physical address PA, so that the SPM performs IPA-to-PA address translation based on the first address translation relationship when transmitting data from the SP to the VM. The PA is a memory address.

In a possible implementation, the IPA allocated to the VM is a contiguous address, and the PA obtained by performing, based on the first address translation relationship, address translation on the IPA allocated to the VM is a discrete address.

In a possible implementation, a first virtualization translation table base address register vttbr_el2 and a first control register vtcr_el2 are deployed in the REE. The first address translation relationship includes: a base address of a page table that is configured in the first vttbr_el2 and that is used for performing stage-2 memory address translation (stage 2 translation) on the REE side, an address translation attribute that is configured in the first vtcr_el2 and that is used for performing the stage-2 memory address translation on the REE side, and the IPA allocated to the VM. The IPA allocated to the VM may be translated into the PA based on the base address and a memory translation rule expressed by the address translation attribute.

In a possible implementation, the SPM is configured to transfer the IPA allocated to the VM to the SP. The SP is configured to establish a second address mapping relationship based on the IPA allocated to the VM, and a second address translation relationship includes an address translation relationship from a virtual address VA to an IPA, so that the SP performs VA-to-IPA address translation based on the second address mapping relationship when transmitting the data to the VM.

In a possible implementation, a second vttbr_el2 and a second vtcr_el2 are deployed in the TEE. The SPM is configured to write the base address to the second vttbr_el2, and writes the address translation attribute to the second vtcr_el2, so that the SPM performs the IPA-to-PA address translation based on the base address stored in the second vttbr_el2 and the address translation attribute stored in the second vtcr_el2 when transmitting the data from the SP to the VM.

In a possible implementation, the SPM is configured to receive a start request sent by the VMM, where the start request indicates the SPM to start the SP; and write the base address to the second vttbr_el2 and write the address translation attribute to the second vtcr_el2 when starting the SP.

In a possible implementation, the VMM is configured to: write the first address translation relationship to a general-purpose register, and triggers, based on an SMC instruction, the SPM to obtain the first address translation relationship from the general-purpose register.

For related descriptions of the computer system in this embodiment, refer to FIG. 1 to FIG. 10 in the foregoing embodiments and descriptions of related embodiments. Details are not described herein again.

This application further provides a non-volatile computer-readable storage medium. The non-volatile computer-readable storage medium includes computer instructions. When the computer instructions are executed by a computer, the interrupt handling method in the foregoing embodiments can be implemented.

Figure 11:
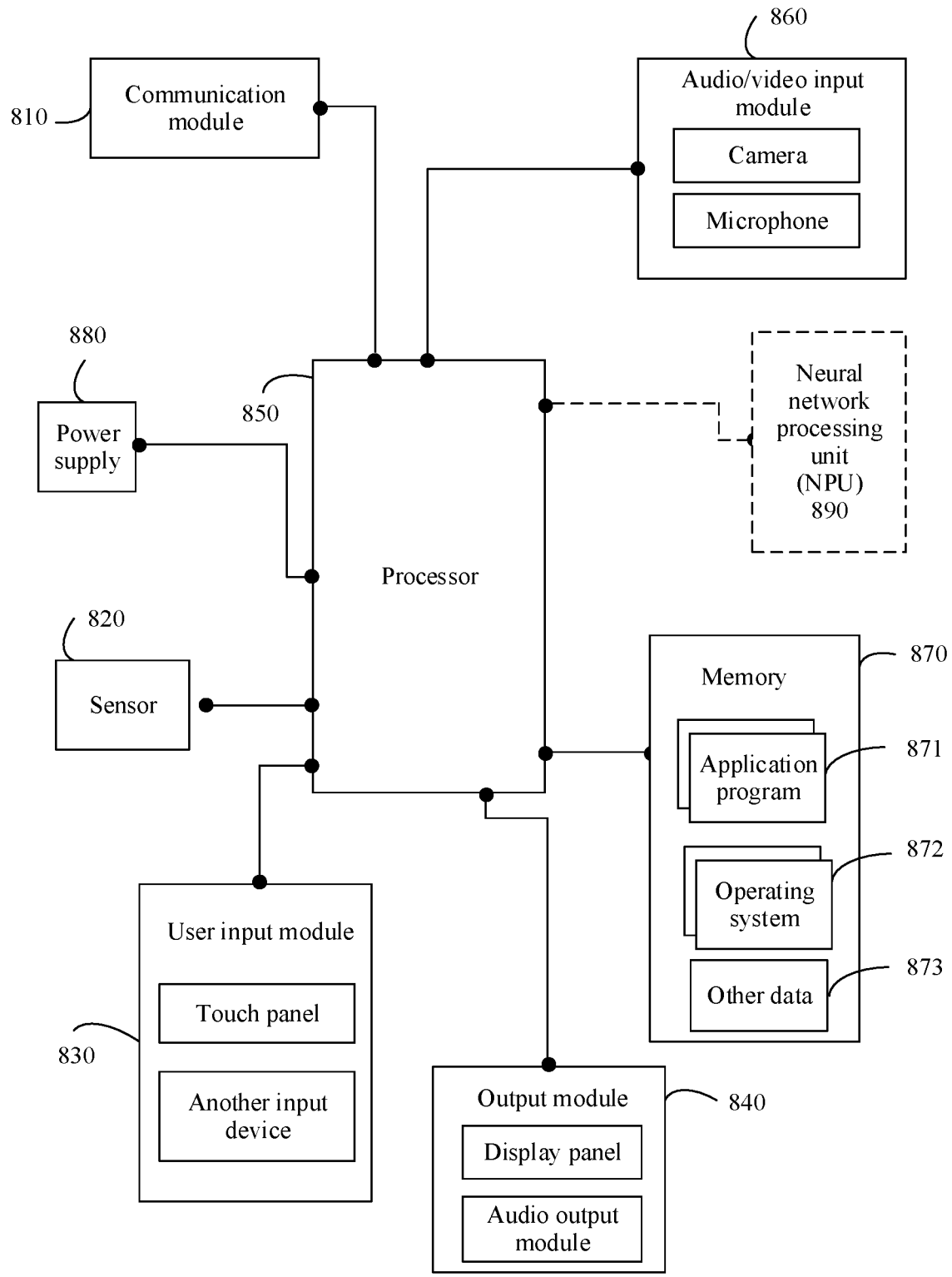
FIG. 11 is a schematic diagram of a structure of a computer system according to an embodiment.

FIG. 11 is a schematic diagram of a structure of a computer system according to an embodiment. The computer system may be a terminal device (or referred to as an intelligent terminal) or a server. As shown in the figure, the computer system includes a communication module 810, a sensor 820, a user input module 830, an output module 840, a processor 850, an audio/video input module 860, a memory 870, and a power supply 880. Further, the computer system provided in this embodiment may further include an NPU 890.

The communication module 810 may include at least one module that can enable the computer system to communicate with a communication system or another computer system. For example, the communication module 810 may include one or more of a wired network interface, a broadcast receiving module, a mobile communication module, a wireless internet module, a local area communication module, and a location (or positioning) information module. The plurality of modules each have a plurality of implementations in a conventional technology, and details are not described one by one in this application.

The sensor 820 can sense a current state of the system, for example, an on/off state, a location, whether the system is in contact with a user, a direction, and acceleration/deceleration. In addition, the sensor 820 can generate a sensing signal used to control an operation of the system.

The user input module 830 is configured to: receive input digital information, character information, or a contact touch operation/contactless gesture, and receive signal input related to user settings and function control of the system, and the like. The user input module 830 includes a touch panel and/or another input device.

The output module 840 includes a display panel, configured to display information entered by the user, information provided for the user, various menu interfaces of the system, and the like. Optionally, the display panel may be configured in a form such as a liquid crystal display (liquid crystal display, LCD) or an organic light-emitting diode (organic light-emitting diode, OLED). In some other embodiments, the touch panel may cover the display panel, to form a touch display screen. In addition, the output module 840 may further include an audio output module, an alarm, a tactile module, and the like.

The audio/video input module 860 is configured to input an audio signal or a video signal. The audio/video input module 860 may include a camera and a microphone.

The power supply 880 may receive external power and internal power under control of the processor 850, and provide power required by operations of various components of the system.

The processor 850 includes one or more processors. For example, the processor 850 may include a central processor and a graphics processing unit. In this application, the central processor has a plurality of cores, and is a multi-core processor. The plurality of cores may be integrated into one chip, or each of the plurality of processors may be an independent chip.

The memory 870 stores a computer program, and the computer program includes an operating system program 872, an application program 871, and the like. For example, a typical operating system is a system used for a desktop computer or a notebook computer, such as WINDOWS™ of Microsoft or MACOS™ of Apple; or a system used for a mobile terminal, such as an Android-based system developed by Google. The method provided in the foregoing embodiment may be implemented by using software, and may be considered as specific implementation of the operating system program 872. The memory 870 may be one or more of the following types: a flash (flash) memory, a hard disk type memory, a micro multimedia card type memory, a card memory (for example, an SD or XD memory), a random access memory (random access memory, RAM), a static random access memory (static RAM, SRAM), a read-only memory (read only memory, ROM), an electrically erasable programmable read-only memory (electrically erasable programmable read-only memory, EEPROM), a programmable read-only memory (programmable ROM, PROM), a replay protected memory block (replay protected memory block, RPMB), a magnetic memory, a magnetic disk, or an optical disc. In some other embodiments, the memory 870 may alternatively be a network storage device on the internet. The system may perform an operation such as updating or reading the memory 870 on the internet.

The processor 850 is configured to: read the computer program from the memory 870, and then perform a method defined by the computer program. For example, the processor 850 reads the operating system program 872, to run an operating system in the system and implement various functions of the operating system; or reads one or more application programs 871, to run an application in the system.

The memory 870 further stores other data 873 in addition to the computer program.

The NPU 890 is mounted to the main processor 850 as a coprocessor, and is configured to execute a task assigned by the main processor 850 to the NPU 890. In this embodiment, the NPU 890 may be invoked by one or more sub-threads of a facial recognition TA, to implement some complex algorithms in facial recognition. Specifically, the sub-thread of the facial recognition TA runs on a plurality of cores of the main processor 850, then the main processor 850 invokes the NPU 890, and a result implemented by the NPU 890 is returned to the main processor 850.

A connection relationship between the foregoing modules is merely an example. The method for configuring an address translation relationship provided in any embodiment of this application may also be applied to a terminal device or a server in another connection manner. For example, all modules are connected through a bus.

Figure 12:
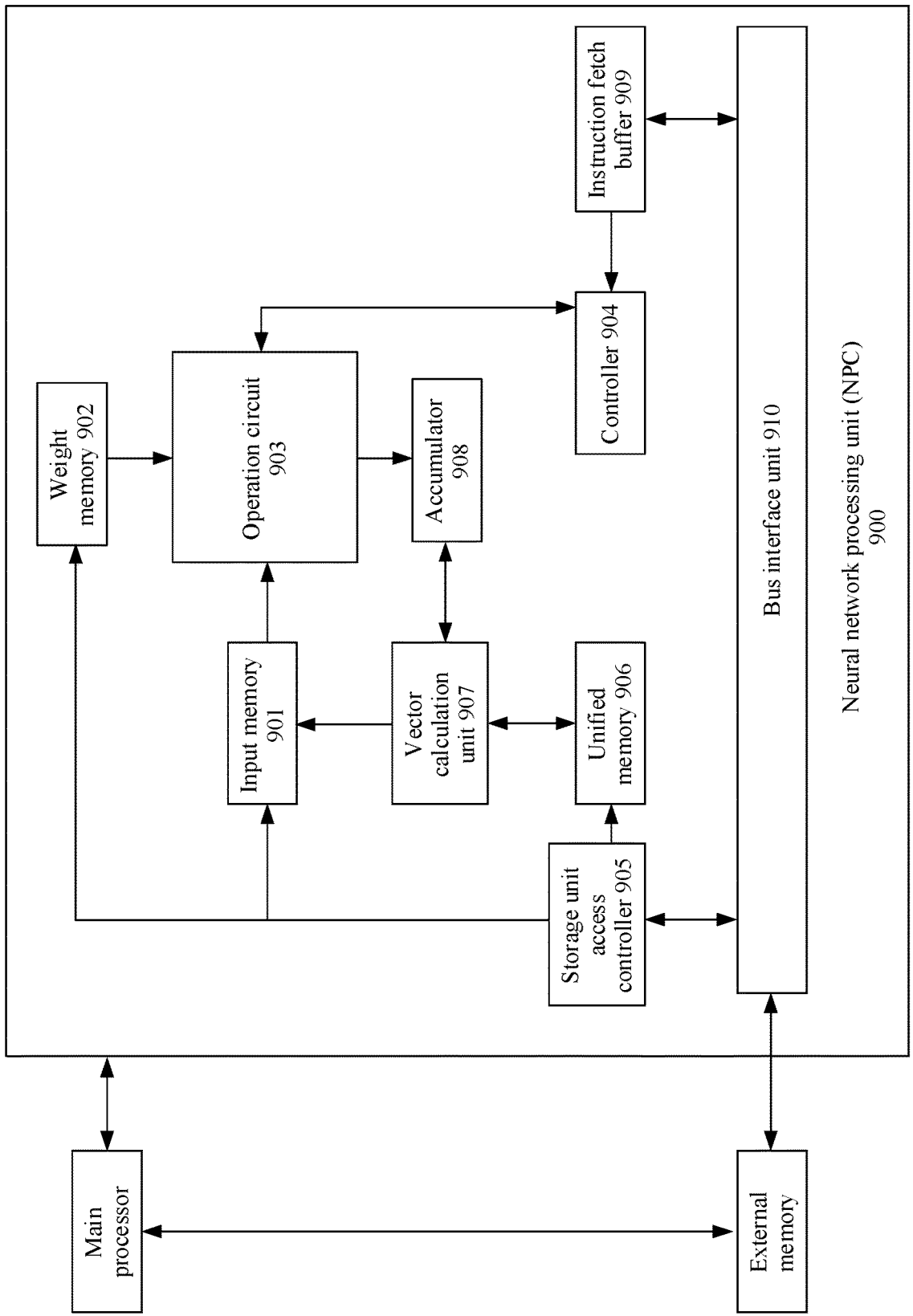
FIG. 12 is a schematic diagram of a structure of an NPU according to an embodiment.

FIG. 12 is a schematic diagram of a structure of an NPU 900 according to an embodiment. The NPU 900 is connected to a main processor and an external memory. A core part of the NPU 900 is an operation circuit 903, and a controller 904 controls the operation circuit 903 to extract data in a memory and perform a mathematical operation.

In some implementations, the operation circuit 903 includes a plurality of processing engines (process engine, PE). In some implementations, the operation circuit 903 is a two-dimensional systolic array. The operation circuit 903 may alternatively be a one-dimensional systolic array or another electronic circuit that can perform mathematical operations such as multiplication and addition. In some other implementations, the operation circuit 903 is a general-purpose matrix processor.

For example, it is assumed that there is an input matrix A, a weight matrix B, and an output matrix C. The operation circuit 903 fetches data corresponding to the matrix B from a weight memory 902 and buffers the data on each PE of the operation circuit 903. The operation circuit 903 obtains data of the matrix A from the input memory 901 to perform a matrix operation on the matrix B, and stores an obtained partial result or an obtained final result of the matrix into an accumulator (accumulator) 908.

A unified memory 906 is configured to store input data and output data. Weight data is directly transferred to the weight memory 902 by using a storage unit access controller 905 (for example, a direct memory access controller, DMAC).

The input data is also transferred to the unified memory 906 by using the storage unit access controller 905.

A bus interface unit 910 (bus interface unit, BIU) is configured to interact with the storage unit access controller 905 and an instruction fetch buffer 909 (instruction fetch buffer) through an AXI (advanced extensible interface) bus.

The bus interface unit 910 is used by the instruction fetch buffer 909 to obtain instructions from the external memory, and is further used by the storage unit access controller 905 to obtain original data of the input matrix A or the weight matrix B from the external memory.

The storage unit access controller 905 is mainly configured to transfer input data in the external memory to the unified memory 906, transfer the weight data to the weight memory 902, or transfer the input data to the input memory 901.

A vector calculation unit 907 usually includes a plurality of operation processing units. If required, further processing is performed on an output of the operation circuit 903, such as vector multiplication, vector addition, an exponential operation, a logarithmic operation, and/or value comparison.

In some implementations, the vector calculation unit 907 can store a processed vector into the unified memory 906. For example, the vector calculation unit 907 may apply a non-linear function to the output of the operation circuit 903, for example, to a vector of an accumulated value, to generate an activation value. In some implementations, the vector calculation unit 907 generates a normalized value, a combined value, or both. In some implementations, the processed vector can be used as activation input of the operation circuit 903.

The instruction fetch buffer 909 connected to the controller 904 is configured to store instructions used by the controller 904.

The unified memory 906, the input memory 901, the weight memory 902, and the instruction fetch buffer 909 are all on-chip memories. The external memory in the figure is independent of the NPU hardware architecture.

It should be noted that the method for configuring an address translation relationship provided in this embodiment may also be applied to a non-terminal computer device, for example, a cloud server.

Persons skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, or another network device) to perform all or a part of the steps of the methods in the embodiment in FIG. 5 of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for configuring an address translation relationship, the method comprises:
    transferring, by a virtual machine manager (VMM) deployed in a rich execution environment (REE) of a computer system, a first address translation relationship to a secure partition manager (SPM) deployed in a trusted execution environment (TEE) of the computer system, wherein the first address translation relationship comprises an address translation relationship from an intermediate physical address (IPA) allocated to a virtual machine (VM) deployed in the REE to a physical address (PA) for the SPM to perform IPA-to-PA address translation based on the first address translation relationship when transmitting data from the SP to the VM, wherein the PA is a memory address.

2. The method according to claim 1, wherein the IPA allocated to the VM is a contiguous address, and the PA is a discrete address obtained by performing, based on the first address translation relationship, address translation on the IPA.

3. The method according to claim 1, wherein a first virtualization translation table base address register (vttbr_el2) and a first control register (vtcr_el2) are deployed in the REE, and the first address translation relationship comprises: a base address of a page table configured in the first vttbr_el2 and used for performing stage-2 memory address translation (stage 2 translation) on a REE side, an address translation attribute configured in the first vtcr_el2 and used for performing the stage-2 memory address translation on the REE side, and the IPA, wherein the IPA is translated into the PA based on the base address and a memory translation rule expressed by the address translation attribute.

4. The method according to claim 3, wherein the method further comprises:
    transferring, by the SPM, the IPA allocated to the VM to the SP, wherein the SP is configured to establish a second address mapping relationship based on the IPA allocated to the VM, and a second address translation relationship comprises an address translation relationship from a virtual address (VA) to an IPA for the SP to perform VA-to-IPA address translation based on the second address mapping relationship when transmitting the data to the VM.

5. The method according to claim 3, wherein a second vttbr_el2 and a second vtcr_el2 are deployed in the TEE, and the method further comprises:
    writing, by the SPM, the base address to the second vttbr_el2; and
    writing the address translation attribute to the second vtcr_el2 for the SPM to perform the IPA-to-PA address translation based on the base address stored in the second vttbr_el2 and the address translation attribute stored in the second vtcr_el2 when transmitting the data from the SP to the VM.

6. The method according to claim 5, wherein before the writing, by the SPM, the base address to the second vttbr_el2, and writing the address translation attribute to the second vtcr_el2, the method further comprises:
    receiving, by the SPM, a start request sent by the VMM, wherein the start request indicates the SPM to start the SP; and
    writing the base address to the second vttbr_el2 and writing the address translation attribute to the second vtcr_el2 when starting the SP.

7. The method according to claim 3, wherein the transferring, by the VMM, a first address translation relationship to the SPM comprises:
    writing, by the VMM, the first address translation relationship to a general-purpose register; and
    triggering, based on an SMC instruction, the SPM to obtain the first address translation relationship from the general-purpose register.

8. A computer system comprising: a rich execution environment (REE) and a trusted execution environment (TEE), wherein a virtual machine (VM) and a virtual machine manager (VMM) are deployed in the REE, and a secure partition (SP) and a secure partition manager (SPM) are deployed in the TEE; and wherein
    the VMM is configured to transfer a first address translation relationship to the SPM, wherein the first address translation relationship comprises an address translation relationship from an intermediate physical address (IPA) allocated to the VM to a physical address (PA) for the SPM to perform IPA-to-PA address translation based on the first address translation relationship when transmitting data from the SP to the VM, wherein the PA is a memory address.

9. The computer system according to claim 8, wherein the IPA allocated to the VM is a contiguous address, and the PA is a discrete address obtained by performing, based on the first address translation relationship, address translation on the IPA.

10. The computer system according to claim 8, wherein a first virtualization translation table base address register (vttbr_el2) and a first control register (vtcr_el2) are deployed in the REE, and the first address translation relationship comprises: a base address of a page table configured in the first vttbr_el2 and used for performing stage-2 memory address translation (stage 2 translation) on a REE side, an address translation attribute configured in the first vtcr_el2 and used for performing the stage-2 memory address translation on the REE side, and the IPA, wherein the IPA is translated into the PA based on the base address and a memory translation rule expressed by the address translation attribute.

11. The computer system according to claim 10, wherein the SPM is configured to transfer the IPA allocated to the VM to the SP, the SP is configured to establish a second address mapping relationship based on the IPA allocated to the VM, and a second address translation relationship comprises an address translation relationship from a virtual address VA to an IPA for the SP to perform VA-to-IPA address translation based on the second address mapping relationship when transmitting the data to the VM.

12. The computer system according to claim 10, wherein a second vttbr_el2 and a second vtcr_el2 are deployed in the TEE; and the SPM is configured to write the base address to the second vttbr_el2, and write the address translation attribute to the vtcr_el2 for the SPM to perform the IPA-to-PA address translation based on the base address stored in the second vttbr_el2 and the address translation attribute stored in the second vtcr_el2 when transmitting the data from the SP to the VM.

13. The computer system according to claim 12, wherein the SPM is configured to:
receive a start request sent by the VMM, wherein the start request indicates the SPM to start the SP; and
write the base address to the second vttbr_el2 and write the address translation attribute to the second vtcr_el2 when starting the SP.

14. The computer system according to claim 10, wherein the VMM is configured to:
write the first address translation relationship to a general-purpose register; and
trigger, based on an SMC instruction, the SPM to obtain the first address translation relationship from the general-purpose register.

* * * * *